United States Patent [19]

Campbell

[11] Patent Number: 4,661,364

[45] Date of Patent: Apr. 28, 1987

[54] DOUGH PUMP WITH DEGASSING SYSTEM

[75] Inventor: Sterrett P. Campbell, Norcross, Ga.

[73] Assignee: AMF Corporation, Richmond, Va.

[21] Appl. No.: 733,240

[22] Filed: May 10, 1985

Related U.S. Application Data

[60] Continuation-in-part of Ser. No. 571,999, Jan. 19, 1984, Pat. No. 4,517,212, which is a division of Ser. No. 251,261, Apr. 6, 1981, Pat. No. 4,449,908, which is a continuation-in-part of Ser. No. 58,120, Jul. 16, 1979, abandoned.

[51] Int. Cl.$^4$ .................... A21D 6/00; A21C 9/00; B67D 1/08

[52] U.S. Cl. .................... 426/496; 222/152; 366/191; 425/203; 426/503

[58] Field of Search ............... 426/496, 503, 504, 486; 425/204, 208, 203; 366/85, 86, 323, 191; 222/152, 413, 271; 99/472

[56] References Cited

U.S. PATENT DOCUMENTS

| | | |
|---|---|---|
| 1,221,594 | 4/1917 | Richman . |
| 1,944,464 | 1/1934 | Richardson .......................... 425/142 |
| 2,099,119 | 11/1937 | King et al. .......................... 425/164 |
| 2,231,357 | 2/1941 | Burghauser et al. ................. 366/85 |
| 2,434,707 | 1/1948 | Marshall .............................. 264/349 |
| 2,615,199 | 10/1952 | Fuller ................................... 425/204 |
| 2,642,643 | 6/1953 | Montague ........................ 425/376 R |
| 2,666,398 | 1/1954 | Gendler et al. ...................... 107/4 |
| 3,203,370 | 8/1965 | Haug et al. .......................... 366/85 |
| 3,225,715 | 12/1965 | Page .................................... 425/204 |
| 3,633,880 | 1/1972 | Newmark ............................. 425/203 |
| 3,927,611 | 12/1975 | Papalexis ............................. 99/472 |

FOREIGN PATENT DOCUMENTS 207170  2/1968  U.S.S.R. ............................... 366/85

OTHER PUBLICATIONS

Drawing, Pak-It Mfg. Co., "Dough Pump Unit", Date 02/13/80.

Primary Examiner—George Yeung
Attorney, Agent, or Firm—Thomas & Kennedy

[57] ABSTRACT

Dough is moved by a screw conveyor (28) in the bottom of a hopper (12) through a hopper discharge opening (25) and through a discharge conduit (14). A wedge-shaped shield (58) is mounted in the lower portion of the hopper over the screw conveyor (28) and divides the dough moving down the hopper and guides the dough to opposite side of the screw conveyor and maintains an air passage (92) in the dough over the screw conveyor and in communication with the discharge conduit (14). A partial vacuum is drawn in the air passage (92) to evacuate gas from the dough.

16 Claims, 7 Drawing Figures

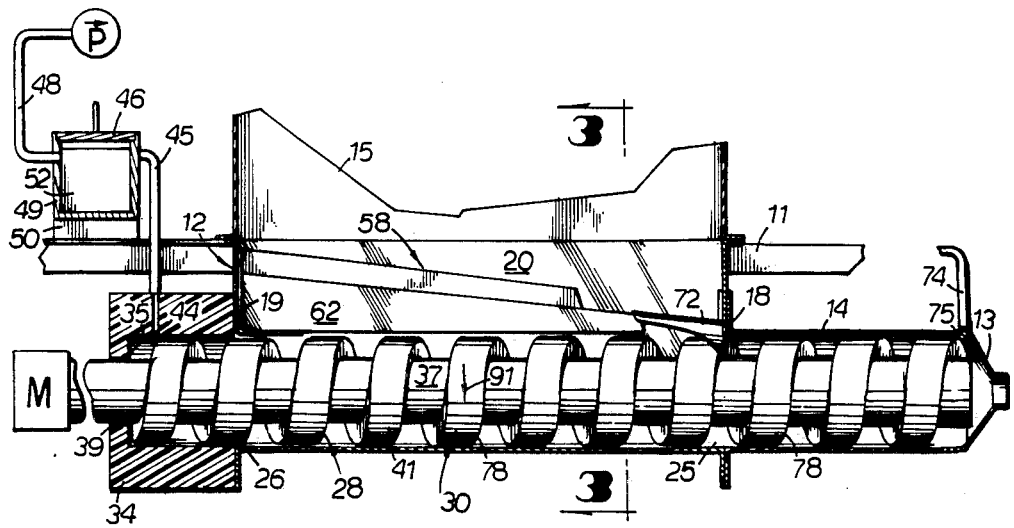
FIG 2
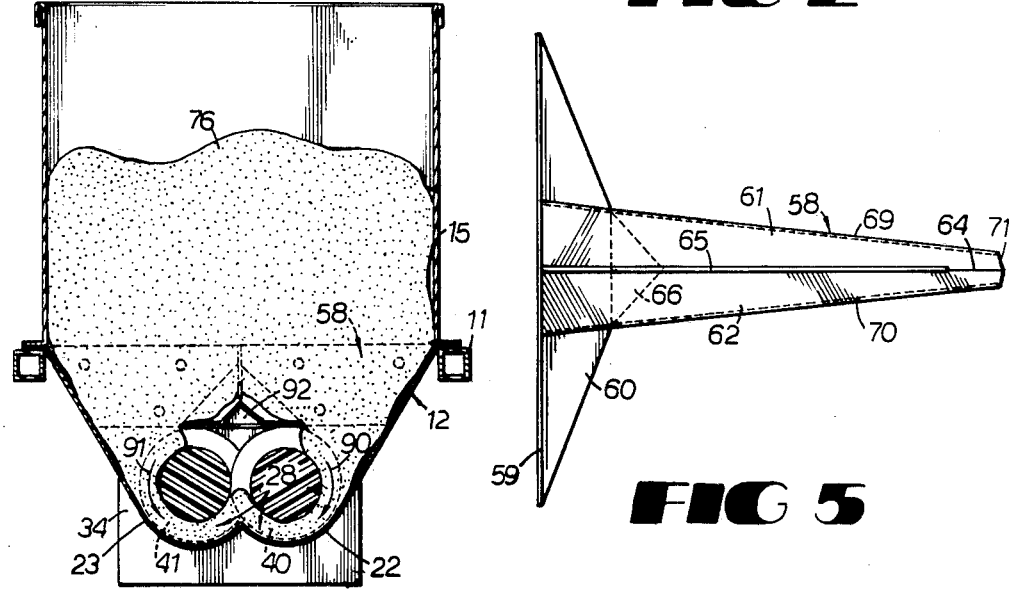
FIG 3
FIG 5
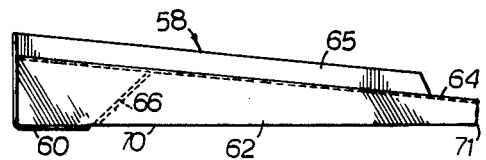
FIG 6

DOUGH PUMP WITH DEGASSING SYSTEM

CROSS REFERENCE TO RELATED APPLICATIONS

This application is a continuation-in-part of U.S. patent application Ser. No. 571,999 filed Jan. 19, 1984, now U.S. Pat. No. 4,517,212 issued May 14, 1985; which is a division of U.S. patent application Ser. No. 251,261 filed Apr. 6, 1981, now U.S. Pat. No. 4,449,908 issued May 22, 1984; which is a continuation-in-part of U.S. patent application Ser. No. 058,120, filed July 16, 1979, now abandoned.

TECHNICAL FIELD

This invention relates to a method and apparatus for dispensing dough and the like which is received in a batch from a mixer and which is to be transported in smaller quantities to a subsequent work station such as to a dough divider of the type used to form the dough into biscuits, buns, etc. More particularly the invention relates to an interference fit helical pump for moving baker's dough and the like which includes a system for extracting air and other gas from the dough.

DESCRIPTION OF THE PRIOR ART

When dough is mixed usually it is blended in a large mixer, and the batch of dough in the mixer must be transported to another location where the batch is divided into smaller parts such as into biscuits, loaves, buns, etc. When a batch of dough is transported from the mixer to one of the several dough dividers in a typical bakery, the entire batch from the mixer usually is dumped into a transport vehicle, the transport vehicle is moved to the divider apparatus, and all or a portion of the batch is dumped into a hopper that feeds the dough divider apparatus. The dividing process usually is carefully performed so that each biscuit, bun, etc, divided from the batch of dough is of consistent weight so that when the product is subsequently baked or otherwise cooked, packaged and delivered, each of the products will be of substantially uniform size, weight and density. Prior art apparatus are illustrated in U.S. Pat. Nos. 2,858,775 and 3,941,538.

When dough has been mixed and is waiting to be divided into smaller biscuits, buns, etc., gas is generated by the dough, the gasses of the dough tend to expand and the dough tends to rise so that it becomes less dense and occupies a larger volume per unit of weight. Thus, the last portion of a batch of dough that is waiting to be divided is likely to be less dense than the first portion. Since the equipment used for dividing dough functions to divide the dough into uniform volumes, the dividing equipment will continue to form the biscuits, buns, etc. with the same volume but with less weight of dough as the dough from the batch rises, causing the subsequent products to be different from those products made from the first dough taken from the batch. As this happens, the dough divider operator or the automatic control equipment of the system attempts to compensate for the less dense dough by adjusting the operation of the divider to cause the biscuits, buns, etc. to be formed in larger volumes but of the same weight. However, it is desirable to dispense the dough from the mass of dough to the dough divider with as little gas as possible mixed in the dough. This avoids the presence of excess voids in the baked product.

SUMMARY OF THE INVENTION

Briefly described, the present invention comprises a dough dispensing system wherein a batch of dough and the like is received from a dough mixer in a hopper and the dough is progressively dispensed from the batch or mass of dough through an opening in the lower portion of the hopper to a subsequent work station such as to a dough divider. The dough is worked as it is dispensed from the bottom of the hopper and the gasses emanating from the dough are removed from the dough as the dough is worked, thereby maintaining and restoring the dough approximately to its original density as when received from the dough mixer.

In general, a batch of dough is deposited in a hopper with inwardly converging side walls, the dough is moved at the lower portion of the hopper along a laterally extending path through the hopper and through and outlet opening in the lower portion of the hopper, an air passage is maintained through the batch of dough in the hopper above and along the path of movement of the moving dough, and a partial vacuum is drawn in the air passage to remove gas from the dough.

A screw conveyor, comprising for example a pair of interference helical screw conveyor elements, is located at the bottom of a hopper to transport the dough through a discharge conduit extending from the opening in the bottom of the hopper. The helical conveyor elements also extend through the discharge conduit so as to positively displace the dough through the discharge conduit and to divide the dough into small batches which are individually worked and degassed as they are moved through the discharge conduit to the discharge nozzle. The discharge nozzle creates back pressure in the discharge conduit, causing a substantial portion of the gasses about the batches of dough in the screw conveyor to be vented through a small vent port to the atmosphere, so that the dough being discharged from the nozzle is of a consistency and density approximately the same as when discharged from the dough mixer.

In order to remove gas from the dough before the dough is dispensed from the bottom of the hopper, a gas passage is formed over the upper surfaces of the screw conveyor elements and a partial vacuum is continuously drawn in the gas passage. This extracts gas from the dough as the dough is being moved from the bottom of the mass of dough toward the subsequent work station. The gas passage is formed by a shield positioned over the intersection of the upper surfaces of the screw conveyor elements and by rotating the screw conveyor elements in opposite directions, each with their upper surfaces moving away from the other element, which tends to move the dough downwardly about the pair of conveyor elements.

Thus, it is an object of this invention to provide a dispensing system for baker's dough and the like which maintains and restores the dough to a known and desired density, which degasses the dough and which progressively dispenses the dough to a subsequent processing station such as to a dough divider.

Another object of this invention is to provide a dough pump method and apparatus which is inexpensive to construct and to maintain and which dispenses dough on a progressive basis from a large batch of dough at a desired density.

Another object of this invention is to provide a dough pump method and apparatus wherein the dough is progressively retrived from the lower portion of a batch of dough, worked, degassed and dispensed at a desired density.

Other objects, features and advantages of the present invention will become aparent upon reading the following specification, when taken in conjunction with the accompanying drawing.

BRIEF DESCRIPTION OF THE DRAWING

FIG. 2 is a side cross sectional view of the lower hopper, a conveyor screw element and their related elements;

FIG. 3 is an end cross sectional view of the lower and upper hoppers, the screw conveyor in the lower hopper, taken along lines 3—3 of FIG. 2;

FIG. 5 is a plan view of the degassing wedge;

FIG. 6 is a side elevational view of the degassing wedge; and

DETAILED DESCRIPTION

Figure 1:
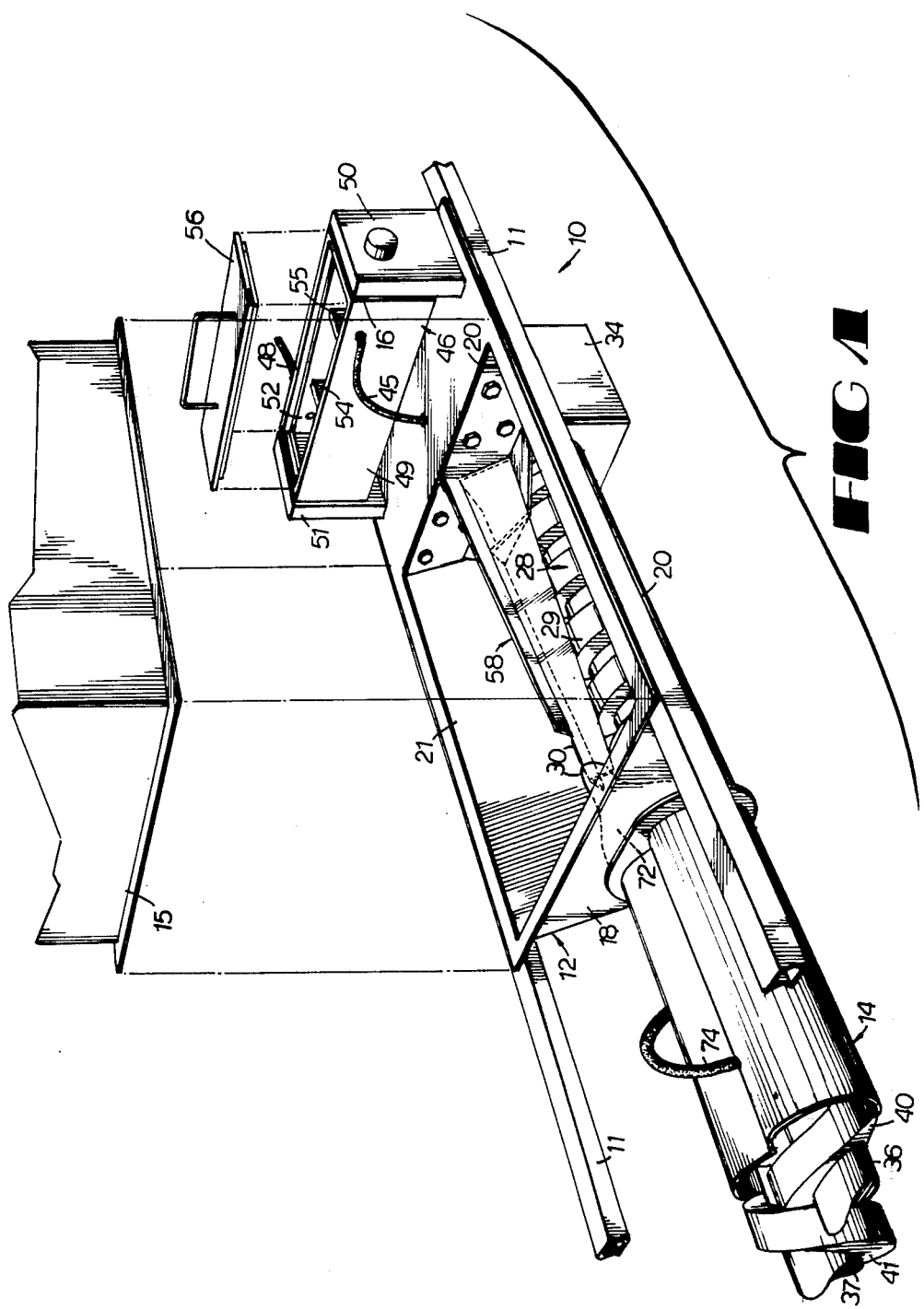
FIG. 1 is a perspective illustration of the dough pump, showing the hopper, degassing wedge, screw conveyor, discharge conduit, and vacuum plenum, with portions of some elements removed for clarity, and with some elements shown spaced from others.

Referring now in more detail to the drawings, in which like numerals indicate like parts throughout the several views, FIG. 1 illustrates the dough pump 10 which usually is placed beneath a dough mixer (not shown) and which dispenses dough for delivery to a subsequent work station, such as to a dough divider (not shown) or through a nozzle 13. For example, the dough pump can dispense dough directly to a subsequent piece of equipment, such as to a dough divider of the type disclosed in U.S. Pat. No. 4,332,538, or can dispense to a conveyor belt or to a movable container for transporting the dough. Dough pump 10 includes a support framework 11, a lower hopper 12, dough discharge conduit 14, upper hopper 15 and vacuum plenum 46.

Figure 4:
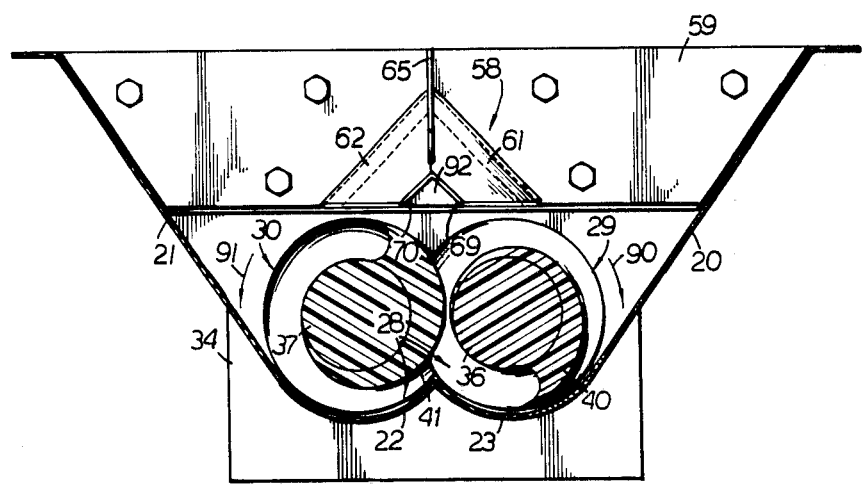
FIG. 4 is an end cross sectional view, similar to FIG. 3, but showing only the lower hopper, the degassing wedge and the screw conveyor, showing modified conveying threads on the screw conveyor.

Lower hopper 12 includes vertical end walls 18 and 19, converging side walls 20 and 21, with the side walls 20 and 21 merging in a rounded, double channel configuration forming a cradle at the bottom of the hopper, with the channels 22 and 23 extending horizontally along the length of the lower hopper (FIG. 4). A discharge opening 25 is formed in the lower portion of vertical end wall 18, and drive opening 26 is formed in the lower portion of the opposite end wall 19, with the discharge opening 25 and drive opening 26 aligned with each other along the length of the double channels 22 and 23. A screw conveyor 28 extends along the bottom of lower hopper 12, along the double channels 22 and 23 (FIG. 4), with the screw conveyor extending through the discharge opening 25 and drive opening 26 in the lower portion of the lower hopper 12 (FIG. 2).

Screw conveyor 28 comprises a pair of oppositely threaded helical interference screw elements 29 and 30, with the conveyor thread of each screw element extending into the space between the thread of the opposite screw element. The discharge opening 25 and drive opening 26 in the lower portion of lower hopper 12 are of double lobe configuration and conform in shape to the outer surfaces of the screw conveyor 28. An electrical drive motor M is schematically illustrated in FIG. 2 and is connected through a series of gear reduction modules (not shown) to screw elements 29 and 30.

Drive housing 34 is mounted to vertical end wall 19 of lower hopper 12 (FIG. 2) and defines a double lobe bore 35 that matches the shape of drive opening 26 and the outer surfaces of screw conveyor 28, with the double lobe bore aligned with the screw conveyor 28 and drive opening 26. The drive axles 36 and 37 of the screw elements 29 and 30 extend through openings 39 of drive housing 34 and are driven by motor M. The conveyor threads 40 and 41 also extend into the bore 35 of drive housing 34.

As illustrated in FIG. 2, gas exhaust port 44 is formed in drive housing 34, and flexible conduit 45 is connected at one of its ends to gas exhaust port 44. The other end of flexible conduit 45 is connected to vacuum plenum 46. Another flexible conduit 48 is connected at one of its ends to vacuum plenum 46 and at its other end to vacuum pump P. With this arrangement, when pump P is activated a partial vacuum is drawn from pump P through flexible conduit 48 to vacuum plenum 46, then from plenum 46 through flexible conduit 45 to the bore 35 of drive housing 34. This causes a partial vacuum to be communicated to the driven end of screw conveyor 38.

As illustrated in FIG. 1, vacuum plenum 46 comprises a housing 49 pivotally mounted at its ends to upright brackets 50 and 51 of framework 11. Vacuum housing 49 comprises an internal chamber 52 that is divided into compartments by partitions 54 and 55, with the partitions 54 and 55 being shorter than the height of the internal chamber 52, so that the chambers can communicate with each other over the tops of the partitions 54 and 55. Lid 56 is sized and shaped to fit on top of vacuum housing 49, to close the upper opening of the vacuum housing and closing the internal chamber 52. With this arrangement, when pump P (FIG. 2) is activated to draw a vacuum through vacuum housing 49, any dough or other solid particles moving with the stream of gas through the vacuum housing 49 will tend to be collected in one of the chambers of the vacuum housing before it reaches pump P.

As illustrated in FIGS. 1 and 4, degassing wedge 58 is mounted in lower hopper 12 over the upper surfaces of screw conveyor 28. Degassing edge 58 comprises vertically extending support plate 59 (FIGS. 5 and 6), horizontal support flange 60 which is joined along one of its edges to the lower edge of support plate 59, a pair of oppositely extending, downwardly inclined wedge plates 61 and 62 which are joined at their upper mutual edges 64 at a right angle, and a separator plate 65 which is mounted to and extends vertically upwardly from the right angle edge 64 of wedge plates 61 and 62. A triangular support tongue 66 extends at an upward incline from the central portion of horizontal support flange 60 and is joined at its edges to the lower surfaces of wedge plates 61 and 62, and assists in supporting the wedge plates from their lower surfaces.

Degassing wedge 58 is supported in lower hopper 12 over the screw conveyor 28 by attachment of vertical extending support plate 59 of the degassing wedge to vertical end wall 19 of lower hopper 12, with bolts or other conventional attaching means 68. The lower edges 69 and 70 of the wedge plates 61 and 62 extend horizontally over the upper surfaces of the screw elements 29 and 30 (FIG. 4), while the upper right angle edge 64 of the degassing wedge and the separator plate 65 are oriented at a downward incline from the upper portion of vertically extending support plate 59. The wedge plates 61 and 62 are of progressively shorter width from the vertical support plate 59 toward the distal end 70 of the degassing wedge.

Degassing wedge 58 is supported in a cantilever arrangement within lower hopper 12, with the wedge being of progressively narrower dimensions from its vertical support plate 59 toward its distal end 70. This provides more space between the lower edges 69 and 70 of the degassing wedge and the adjacent surfaces of the lower hopper 12, assuring that the dough present in the lower hopper at the screw conveyor can reach the conveying threads of the screw elements.

As illustrated in FIG. 2, a guide plate 72 is mounted in lower hopper 12 and is attached to vertical end wall 18 of the hopper. Guide plate 72 is positioned over and is curved about discharge opening 25 of lower hopper 12 and projects over end 70 of degassing wedge 58, and functions to guide the dough being carried through the hopper by the screw conveyor 28 on into the discharge conduit 14, and to deflect any larger objects, such as the operators fingers, from the vicinity of discharge opening 25. Gas vent conduit 74 is connected at one of its ends to a port 75 formed in discharge conduit 74. The other end of gas vent conduit 74 is connected to a collection chamber (not shown). Gas vent conduit 74 and its port 75 function to exhaust gas from discharge conduit 14 during the operation of the dough pump.

Figure 7:
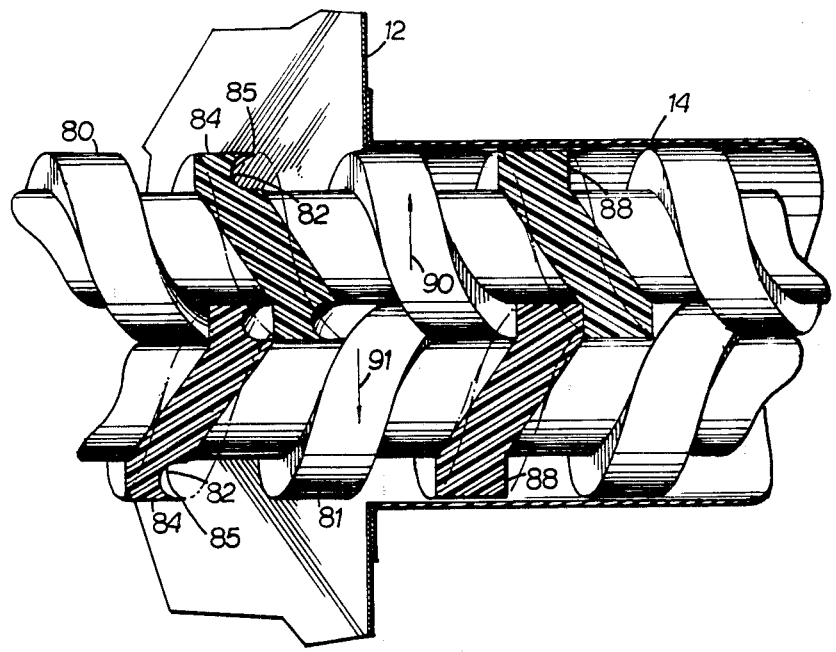
FIG. 7 is a top view of a portion of the screw conveyor, the lower hopper and the discharge conduit, showing the modified conveyor threads on the screw conveyor.

As illustrated in FIG. 2, the pair of oppositely threaded helical interference screw elements 29 and 30 can be formed of conventional right angle thread design, in that the conveying surfaces 78 of the threads extend radially outwardly at a right angle with respect to the drive axles 36 and 37. However, a modified conveying surface shape can be utilized as illustrated in FIGS. 4 and 7. As illustrated in FIG. 7, the modified design screw elements 80 and 81 that extend through the lower portion of lower hopper 12 include concave conveying surfaces 82 that face in the direction of movement of the dough through the hopper, with the conveying surface 82 intersecting the outer peripheral portion 84 of each screw element at an acute angle to form a sharpened slicing edge 85. With this configuration of the conveying surface of the screw elements, the screw elements tend to slice into the lower portion of the batch of dough in the hopper, which tends to avoid the stretching and the tearing action in the dough when the conveyor engages the dough. This reduced stretching and tearing action allows the dough to make a smoother transition from the batch of dough into the threads on the screw elements, thereby reducing the tendency of the dough to rise and to emanate gasses. Once the dough has been sliced and enters the flights screw elements, the concave conveying surface tends to maintain the dough in the flights of the screws As illustrated in FIG. 7, the portions of screw elements 80 and 81 that extend through discharge conduit 14 are of the square thread design, in that they include the right angle conveying surfaces 88. This thread design causes positive displacement of the dough moving through the discharge conduit 14.

OPERATION

When the dough pump is placed in operation, motor M and pump P are activated. Motor M rotates screw elements 29 and 30 or 80 and 81, in opposite directions of rotation, with the upper surfaces of each screw element moving away from the opposite screw element as indicated by direction arrows 90 and 91. Pump P draws a partial vacuum through vacuum housing 49 to the bore 35 of drive housing 34. As illustrated in FIG. 3, when the batch of dough 76 present in upper and lower hoppers 15 and 13 covers the screw elements 29 and 30, the direction of rotation of the screw elements 29 and 30 tends to move the dough downwardly and outside and then beneath the screw elements (FIG. 3), and the interference between the conveyor threads of the screws tends to cause the dough to move longitudinally along the double channels 22 and 23 toward the discharge opening 25 and then on through discharge conduit 14.

The degassing wedge 58 functions as a shield over the upper surfaces of screw elements 29 and 30. The vertically extending separator plate 65 of the degassing wedge tends to divide the dough as it moves downwardly in the hoppers, and the outwardly and downwardly inclined wedge plates 61 and 62 tend to guide the divided dough toward the outer, downwardly moving surfaces of the screw elements 29 and 30. In the meantime, the partial vacuum that is continuously drawn by pump P communicates from bore 35 of drive housing 34 beneath degassing wedge 58 and an air passage 92 is maintained in the dough be degassing wedge 58 above the upper portions of screw elements 29 and 30 over the intersection of the helical threads of the screws. This air passage 92 extends from vertical end wall 19 toward vertical end wall 18 along the length of the screw conveyor, and to guide plate 72 at discharge opening 25. The negative pressure in air passage 92 tends to draw the dough downwardly in the hopper toward the screw conveyor, and tends to draw the gasses from the dough and to move the gasses longitudinally beneath the degassing wedge 58 and out of the lower hopper 12. Moreover, the negative pressure is communicated on through discharge opening 25 and partially through discharge conduit 14, so that air that emerges from the dough in the discharge conduit 14 can move about the peripheral surfaces of the conveyor elements in a counter flow relationship with respect to movement of the the dough through discharge conduit 14, and the air from the discharge conduit can be drawn with the other air in the hopper on through the air passage 92 beneath the degassing wedge 58, and out of the system.

The lobes of the discharge conduit 14 are shaped to conform to the exterior surfaces of the threads of the screw conveyor 28 when the threads of the screw elements are in their operative, interference fit, as illustrated in FIG. 1.

Screw elements 29 and 30 are formed with a diameter that is slightly less than the inside diameter of the lobes of dough discharge conduit 14. For example, the diameter of the portion of each screw element 29 and 30 extending through discharge conduit 14 is 5.400 inches, and the inside diameter of the lobes of the discharge conduit 14 is 5.750 inches. This provides a space of 0.175 inches between the outer surfaces of the screw elements and the interior surface of the dough discharge conduit.

When the product that is being dispensed by the system is baker's dough, the thickness and viscosity of the dough is too great for a significant amount of the dough to move between the outer surfaces of the screw elements and the inner surfaces of the discharge conduit. Therefore, the screw elements function to positively displace the dough through the dough discharge conduit.

However, the space between the screw elements and the discharge conduit is large enough to permit air to pass therethrough and gas present in the dough is able to move across the threads of the screw elements. When the dough is moved to the discharge nozzle 13 at the end of discharge conduit 14, the small opening of the nozzle causes an increased back pressure in the discharge conduit, with the gas in each cavity of the screw conveyor being urged by the back pressure across spaces between the outer surfaces of the screw elements and the inside surfaces of the discharge conduit. In the meantime, the negative pressure communicated to the entrance of the discharge conduit by the air passage beneath the degassing wedge tends to increase the pressure differential from one cavity to the next along the length of the portion of the screw conveyor in discharge conduit 14. This tends to extract the gasses from the dough moving through the discharge conduit.

Of course, the diameter of the screw elements can be increased or decreased as necessary to compensate for work products having different characteristics such as different viscosities, etc.

The positive pressure applied to the dough by the portion of the screw conveyor 28 extending through discharge conduit 14 will cause some of the gasses entrapped in the dough to be expelled through gas vent conduit 74 near the discharge end of discharge conduit 14.

While this invention has been described as operating with baker's dough, it will be understood that various other substances might be handled by the apparatus. For example, the apparatus can dispense cheese, butter, relish, peanut butter, potato salad and dough such as cookie dough having nuts, chocolate chips and other lumpy additives. Therefore, the terms "baker's dough" and "dough" as used in the following claims are to be construed to include other substances with similar flow characteristics. Also, while the passage 92 has been described as an "air" passage, it will be understood that the gasses that will be present in the passage include the gas emanating from the dough and possibly other gasses. Although this invention has been described in the form of preferred embodiments, many modifications, additions, and deletions may be made thereto without departure from the spirit and scope of the invention, a set forth in the following claims.

I claim:

1. A method of dispensing dough comprising depositing a batch of dough into a hopper onto an elongated shield extending over the adjacent surfaces of a pair of interference helical screw elements at the lower portion of the hopper and onto portions of the screw elements, rotating the screw elements to move the dough along the lengths of the screw elements toward a discharge opening in the hopper aligned with the screw elements, maintaining an air passage with said shield at a position between the shield and the screw elements along the length of the screw elements, and drawing a partial vacuum in the air passage to withdraw gas from the dough.

2. The method of claim 1 and wherein the step of rotating the screw elements comprises rotating the screw elements in opposite directions with the upper surface of each screw element moving away from the other screw element, and wherein the step of maintaining an air passage through the dough along the length of the screw elements comprises maintaining an air passage at the intersection of the screw elements along the upper surfaces of the screw elements.

3. The method of claim 1 and wherein the step of maintaining an air passage through the dough along the length of the screw elements comprises maintaining the air passage along the entire lengths of the portions of the screw elements extending in the hopper to the opening in the discharge hopper, and communicating the partial vacuum to the opening in the hopper.

4. The method of claim 2 and wherein the step of drawing a partial vacuum in the air passage comprises drawing the partial vacuum at the end of the screw elements remote from the discharge opening in the hopper to induce a flow of gas along the length of the screw elements in the direction away from the discharge opening.

5. A method of dispensing dough comprising depositing a batch of dough in a hopper with inwardly converging side walls, moving the dough at the lower portion of the hopper along a laterally extending path beneath an elongated shield in the hopper, through the hopper and through an outlet opening in the lower portion of the hopper, maintaining an air passage beneath the shield in the hopper and above and along the path of movement of the moving dough, and drawing a partial vacuum in the air passage to remove gas from the dough.

6. The method of claim 5 and wherein the step of moving the dough along the path comprises engaging the lower portion of the batch of dough with a rotating screw conveyor including at least one helical thread with a concave conveying surface intersecting an outer peripheral surface at an acute angle forming an edge which slices into the batch of dough, so that as the screw conveyor rotates the edge slices into the batch of dough and the concave conveying surface moves the sliced dough.

7. The method of claim 5 and wherein the step of moving the dough comprises rotating a pair of laterally extending parallel interference helical screw elements located in the lower portion of the hopper in opposite directions with their upper surfaces moving away from each other so that dough received in the conveyor screws moves along the lengths of the screw elements, and wherein the step of maintaining an air passage through the batch of dough above and along the path of movement of the dough comprises deflecting the dough laterally with the shield from above the screw elements down around the screw elements to the sides of the screw elements.

8. The method of claim 5 and wherein the step of moving the dough comprises moving the dough in one general direction along the path through the hopper and through the outlet opening, and wherein the step of drawing a partial vacuum in the air passage to remove gas from the dough comprises moving gas in a general direction opposite to the general direction of movement of the dough along the path.

9. The method of claim 5 and further including the step of moving the dough beyond the outlet opening through a conduit, and wherein the step of maintaining an air passage through the batch of dough in the hopper comprises maintaining the air passage in communication with the outlet opening.

10. Apparatus for dispensing dough comprising a hopper for receiving a batch of dough and including at a lower portion thereof a dough discharge opening, a pair of interference fit helical conveyor screws at the lower portion of said hopper and extending laterally to said dough discharge opening, means for rotating said conveyor screws in opposite directions of rotation with the upper surface of each screw moving away from the other screw, an elongated shield positioned over the adjacent surfaces of said helical conveyor screws and extending along the lengths of said helical conveyor screws for maintaining an air passage in the dough above said helical conveyor screws, and means for extracting gas from adjacent the upper surfaces of said helical conveyor screws beneath said shield and discharging the gas out of said hopper, whereby dough moves downwardly in the hopper and about the screws and is moved by the screws through the discharge opening and gas is moved from above the conveyor screws out of the hopper.

11. The apparatus of claim 10 and wherein said shield is mounted to a portion of said hopper remote from said dough discharge opening and is supported as a cantilever and extends toward said dough discharge opening.

12. The apparatus of claim 10 and wherein said shield is wedge-shaped and includes one downwardly sloped surface extending to one side of said conveyor screws and another downwardly sloped surface extending to the other side of said conveyor screws whereby the batch of dough being dispensed from the hopper is divided by the shield and directed to opposite sides of the conveyor screws.

13. The apparatus of claim 10 and further comprising a dough discharge conduit positioned outside said hopper and communicating at one of its ends with said dough discharge opening, said pair of interference fit helical conveyor screws extending beyond said hopper and through said dough discharge conduit, whereby the dough is moved by the screws from the hopper through the dough discharge conduit.

14. Apparatus for dispensing dough comprising a hopper for receiving a batch of dough and including at a lower portion thereof a dough discharge opening, a pair of interference fit helical conveyor screws at the lower portion of said hopper and extending laterally to said dough discharge opening, means for rotating said conveyor screws in opposite directions of rotation with the upper surface of each screw moving away from the other screw, each of said screws including a helical thread with a spiral peripheral surface and a concave conveying surface intersecting said peripheral surface at an acute angle to form a spiral edge, said concave conveying surface being inclined at said spiral edge toward said dough discharge opening whereby the spiral edge slices into the batch of dough and the concave conveying surface tends to hold the sliced dough on its surface and move the dough toward the dough discharge opening, an elongated shield positioned over and extending along the lengths of said helical conveyor screws for maintaining an air passage above said conveyor screws, and means for extracting gas from the air passage and discharging the gas out of said hopper, whereby dough moves downwardly in the hopper and about the screws and is moved by the screws through the discharge opening and gas is moved from above the conveyor screws out of the hopper.

15. Apparatus for dispensing dough comprising a hopper with a dough discharge opening at its lower portion, a pair of interference fit oppositely threaded conveyor screws in the lower portion of said hopper and means for rotating said screws with their upper surfaces moving away from each other for moving dough in said hopper along a path laterally through the lower portion of said hopper and out of said dough discharge opening, an elongated shield positioned in said hopper above said conveyor screws and extending along the length of said conveyor screws for forming an air passage through the dough adjacent said path, and pump means having its inlet in communication with said air passage for drawing gas through said air passage.

16. The apparatus of claim 15 and further including a discharge conduit, and wherein said conveyor screws extend into said discharge conduit, and wherein said shield extends to a position adjacent said discharge opening and communicates the air passage to the discharge opening.

* * * * *